United States Patent [19]

Gorog et al.

[11] 4,019,155

[45] Apr. 19, 1977

[54] ACOUSTO-OPTIC MODULATED LASER

[75] Inventors: Istvan Gorog; Joseph Dale Knox, both of Princeton, N.J.

[73] Assignee: RCA Corporation, New York, N.Y.

[22] Filed: Nov. 5, 1975

[21] Appl. No.: 629,087

[52] U.S. Cl. .................... 331/94.5 M; 350/161 W
[51] Int. Cl.² .......................................... H01S 3/10
[58] Field of Search ................. 331/94.5; 332/7.51; 350/161

[56] References Cited

UNITED STATES PATENTS 3,660,777  5/1972  Erickson ................. 331/94.5 M

*Primary Examiner*—William L. Sikes
*Attorney, Agent, or Firm*—G. H. Bruestle; G. E. Haas

[57] ABSTRACT

A gas laser tube has a spherical reflector at one end and a flat mirror at the other end. An acoustooptic modulator is attached to the flat mirror. The modulator is positioned so that the generated acoustic wave intersects the laser beam at the Bragg angle.

9 Claims, 2 Drawing Figures

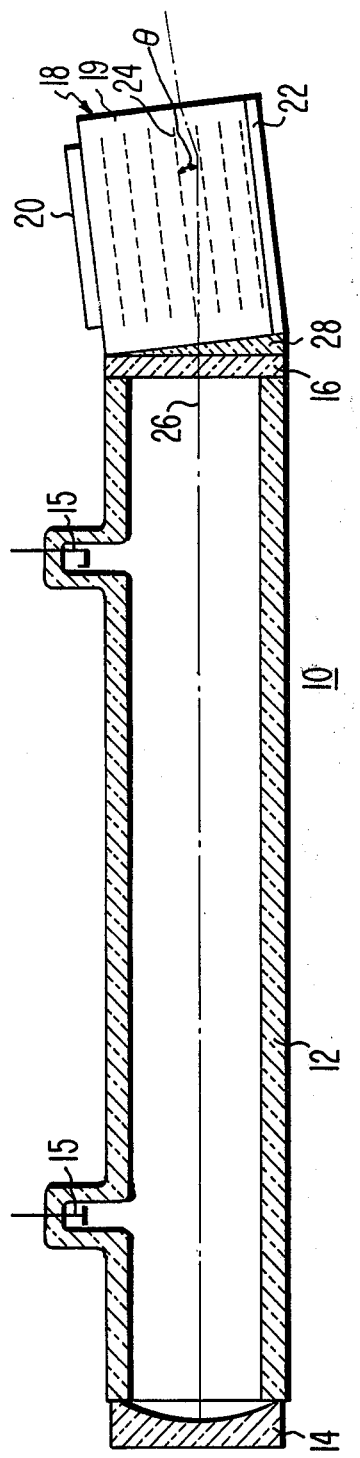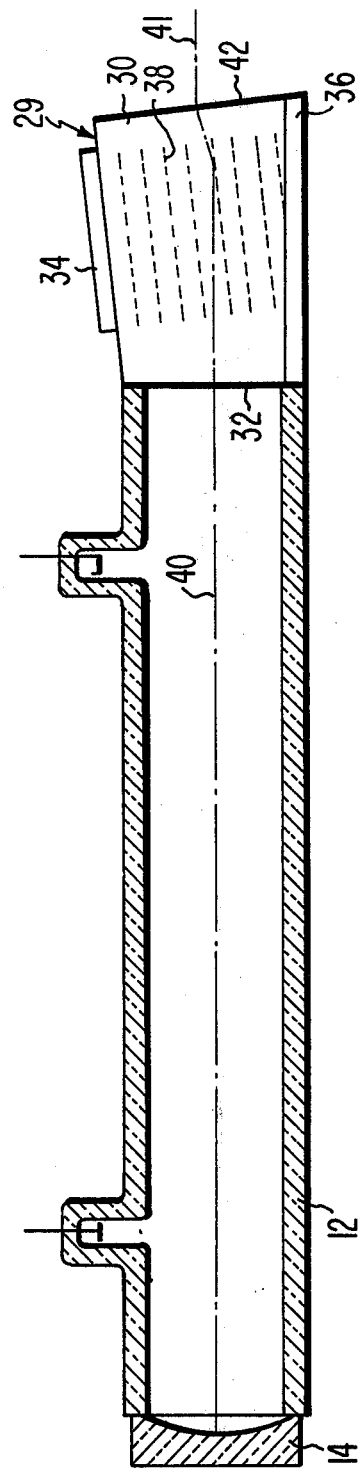

ACOUSTO-OPTIC MODULATED LASER

BACKGROUND OF THE INVENTION

This invention relates to acousto-optic modulated gas lasers.

When a laser beam is to be modulated at a rate between a few kilohertz and one megahertz, the modulator can be positioned within the laser cavity. However, in order to modulate at rates in excess of one megahertz, the standard modulation method employs an extra-cavity acousto-optic or electro-optic modulator. Because of cost considerations, the acousto-optic modulator is preferred over the electro-optic type.

An acousto-optic modulator is composed of a propagation medium which exhibits a change in the index of refraction due to mechanical strain. A piezoelectric transducer may be attached to the modulator to generate ultrasonic acoustic waves. The ultrasonic waves propagating through the modultor medium produce mechanical strain which changes the refractive index of the medium. These mechanically induced changes in the refractive index cause light passing through the medium to be diffracted. The intensity and frequency of the diffracted light are determined by the strain which, in turn, is determined by the modulation signal applied to the transducer. The rise time of acousto-optic modulators is determined by the transit time of the acoustic wave through the laser beam. The rise time may be improved by decreasing the diameter of the laser beam.

Heretofore, the laser beam was conventionally emitted from the end of the laser tube having a spherical mirror. The acousto-optic modulator was spaced from that end of the laser tube. The rise time of the modulator was enhanced by employing focusing means between the laser tube and the modulator. Thus, as the laser beam passed through the modulator, it was focused down to a relatively small diameter. For maximum modulation efficiency, the modulator was positioned so that the acoustic wave intersected the laser beam at the Bragg angle. The Bragg angle $\theta$ being defined as:

$$\theta = \sin^{-1}\left(\frac{\lambda_c}{2\lambda_s}\right)$$

where $\lambda$ is the laser wavelength and $\lambda$ is the wavelength of the acoustic wave. This resulted in quite a complexly aligned system for directing and shaping the laser beam. All of the separate elements of the system have to be maintained in the proper relationship to one another.

SUMMARY OF THE INVENTION

A gas laser has a gas discharge tube having a spherical reflector at one end and a partially reflective flat mirror at the other end. Attached to the flat mirror is an acousto-optic modulator. The modulator is positioned so that the generated acoustic wave intersects the generated laser beam at the Bragg angle.

BRIEF DESCRIPTION OF THE DRAWINGS

FIG. 1 is a partial cross sectional view of one embodiment of the present invention.

FIG. 2 is a partial cross sectional view of another embodiment of the present invention.

DETAILED DESCRIPTION OF THE INVENTION

With initial reference to FIG. 1, a modulated gas laser generally designated as 10, includes a gas laser tube 12 having a spherical mirror 14 and a partially reflective flat mirror at its opposite ends. Although the mirrors are shown attached to the tube ends, one or both may be spaced therefrom with a window on that end, as is well known in the art. The tube 12 contains a lasing gas, such as He-Cd vapor, and electrodes 15 for exciting the gas. A conventional acousto-optic modulator 18 is attached to the exterior surface of the flat mirror 16. The acousto-optic modulator 18 has a propagation medium 19 composed of, for example fused quartz or glass. A piezoelectric transducer 20, of PZT for example, is bonded to one surface of the propagation medium 18. The transducer 20 is for transmitting an acoustic wave through the propagation medium 18. On the opposite surface of the medium 18 from the transducer 20 is acoustic wave absorption material, such as a layer 22 of aluminum, which has a close acoustic impedance match to the medium. The acousto-optic modulator 18 is positioned so that the acoustic wave (designated by dshed lines 24) will intersect the laser beam 26 within the modulator 18 at the Bragg angle $\theta$. A glass wedge 28 is between and in contact with the flat mirror 16 and the modulator 18 to provide the Bragg angle relationship. Preferably the flat mirror 16, the wedge 28 and the propagation medium 19 are made of material with closely matching indices of refraction so the laser beam will not be refracted at their interfaces. Alternatively, by proper selection of materials for the mirror, wedge and medium with different indices of refraction, the laser beam will be refracted so that the beam will be parallel to the axis of the laser as it immerges from the modulator.

The present invention modulates the laser beam in essentially the same way as in prior art external acousto-optic modulating devices. However, by combining the flat mirror and the modulator into a unitized structure, the present invention has eliminated the need for focusing optics and the complex jigging previously necessary in high frequency acousto-optic modulators. The unitized structure has simplified the device by using the flat laser mirror 16 as the output mirror of the laser tube, contrary to conventional practice. The combination of the laser tube 12, the spherical mirror 14 and the flat mirror 16 from a conventional resonator configuration. As is well known in such a resonator configuration, the beam waist, or smallest part of the laser beam, is at the end of the tube having the flat mirror. Therefore, by using the flat mirror as the output mirror and mounting the acousto-optic modulator directly against the flat mirror, the need for focusing optics to reduce the beam's size has been obviated.

An alternate embodiment is shown in FIG. 2. The laser tube 12 has a spherical mirror 14 at one end. An acousto-optic modulator 29 is at the other end of the tube 12. The modulator 29 has an acoustic wave propagation medium 30 similar to medium 19 in FIG. 1. However, a first surface 32 of the medium 29, facing the laser tube 12, is partially reflective so as to form the flat mirror. A piezoelectric transducer 34 is on a second surface of the propagation medium 30 adjacent to the first surface 32. The second surface is at an angle with respect to the first surface 32 so that the acoustic wave 38 generated by the piezoelectric transducer 34 will intersect the laser beam 40 emitted from the tube 12 at the Bragg angle. Acoustic wave absorption material, such as an aluminum layer 36, is on the propagation medium surface which is opposite the second surface. The modulated laser beam 41 exists the modulator 29 through a third surface 42, opposite the first surface 32. The third surface 42 may be cut at an angle so as to refract the laser beam 40 as it emerges from the modulator 30 directing it along a desired path. The embodiment of FIG. 2 operates in the same manner as the modulated laser 10 in FIG. 1. However, in the second embodiment the separate flat mirror 16 and the prism 28 have been eliminated.

We claim:

1. A gas discharge device for generating a modulated laser beam comprising:
    a tube containing an active lasing gas and having means for creating a population inversion in the lasing gas, a spherical mirror and a partially reflective flat mirror at opposite ends of the tube for generating a laser beam; and
    an acousto-optic modulator having a transducer for transmitting an acoustic wave through the modulator, the modulator being attached to the flat mirror so that the flat mirror is between the modulator and the tube.

2. The device as in claim 1 wherein the modulator is oriented with respect to the flat mirror so that the acoustic wave intersects the laser beam at the Bragg angle.

3. The device as in claim 2 wherein the modulator is attached to the flat mirror by means of a wedge of transparent material between the two.

4. The device as in claim 3 wherein the material of the flat mirror, the wedge and the modulator having closely matching indices of refraction.

5. The device as in claim 1 wherein the flat mirror is attached to the end of the tube.

6. The device as in claim 1 wherein the acousto-optic modulator is at one end of the laser tube and the flat mirror is formed on one surface of the modulator.

7. The device as in claim 1 wherein the acousto-optic modulator comprises:
    a transparent propagation medium;
    a piezoelectric transducer on one surface of the medium; and
    acoustic wave absorption material on the surface of the medium opposite the transducer surface, the absorption material having an acoustic impedance which closely matches the acoustic impendance of the medium.

8. The device as in claim 7 wherein the absorption material is a layer of aluminum.

9. The device as in claim 1 wherein the modulator has a surface through which the laser beam exits, the surface being at an angle with respect to the path of the laser beam so as to refract the laser beam.

* * * * *

UNITED STATES PATENT OFFICE
CERTIFICATE OF CORRECTION

PATENT NO. : 4,019,155

DATED : April 19, 1977

INVENTOR(S) : Istvan Gorog and Joseph Dale Knox

It is certified that error appears in the above-identified patent and that said Letters Patent are hereby corrected as shown below:

Column 1, line 51, delete "$\lambda$" and substitute --$\lambda_c$--. Column 1, line 51, delete "$\lambda$", second occurrence, and substitute --$\lambda_s$--. Column 2, line 26, delete "dshed" and substitute --dashed--.

*Signed and Sealed this*

*fifth* Day of *July 1977*

[SEAL]

Attest:

RUTH C. MASON
*Attesting Officer*

C. MARSHALL DANN
*Commissioner of Patents and Trademarks*